US007962131B2

United States Patent
Lee et al.

(10) Patent No.: US 7,962,131 B2
(45) Date of Patent: Jun. 14, 2011

(54) CHANNEL MODE CONVERTING METHOD OF A WIRELESS PORTABLE INTERNET SYSTEM

(75) Inventors: Nam-Suk Lee, Daejeon (KR); Nam-Hoon Park, Daejeon (KR)

(73) Assignees: Samsung Electronics Co., Ltd (KR); Electronics and Telecommunications Research Institute (KR); KT Corporation (KR); SK Telecom Co., Ltd (KR); Hanaro Telecom, Inc. (KR)

( * ) Notice: Subject to any disclaimer, the term of this patent is extended or adjusted under 35 U.S.C. 154(b) by 1215 days.

(21) Appl. No.: 11/603,489

(22) Filed: Nov. 22, 2006

(65) Prior Publication Data

US 2007/0115862 A1    May 24, 2007

(30) Foreign Application Priority Data

Nov. 22, 2005 (KR) .................. 10-2005-0111598

(51) Int. Cl.
*H04M 11/00* (2006.01)
*H04W 4/00* (2009.01)

(52) U.S. Cl. ...................... 455/421; 370/338

(58) Field of Classification Search .......... 370/208–210, 370/329, 335, 342, 332, 328, 338; 455/450–452.2, 455/453–455, 509, 515–516, 511, 67.11, 455/422.1, 423, 421
See application file for complete search history.

(56) References Cited

U.S. PATENT DOCUMENTS

| 5,590,400 A * | 12/1996 | Lopponen ................ 455/509 |
| 6,701,129 B1 * | 3/2004 | Hashem et al. ............ 455/67.11 |
| 7,526,292 B2 * | 4/2009 | Kim et al. ................ 455/450 |
| 2005/0201327 A1 | 9/2005 | Kim et al. |
| 2005/0207505 A1 * | 9/2005 | Lakkis .................... 375/260 |

FOREIGN PATENT DOCUMENTS

| KR | 1020050089699 | 9/2005 |
| KR | 1020050091573 | 9/2005 |
| KR | 1020050091591 | 9/2005 |
| KR | 1020050098413 | 10/2005 |

* cited by examiner

*Primary Examiner* — George Eng
*Assistant Examiner* — Michael Faragalla
(74) *Attorney, Agent, or Firm* — The Farrell Law Firm, P.C.

(57) ABSTRACT

Provided is a channel mode converting method of a wireless portable Internet system. When a diversity channel mode is converted into an Adaptive Modulation and Coding (AMC) channel mode, a radio resource for transmitting Channel Quality Information (CQI) is allocated without responding to a resource allocation request and a request between a terminal and an access point. Therefore, a delay time can be reduced on the channel mode conversion. In addition, a CQI channel for transmitting the existing channel quality information is released and a CQI channel for a new channel is allocated on the channel mode conversion. As a result, a time for changing the diversity channel CQI transmission to the AMC channel CQI transmission at the physical layer can be easily synchronized for transmitting the REP_RSP at the MAC.

14 Claims, 8 Drawing Sheets

CHANNEL MODE CONVERTING METHOD OF A WIRELESS PORTABLE INTERNET SYSTEM

PRIORITY

This application claims benefit under 35 U.S.C. § 119 to an application entitled "Channel Mode Converting Method Of A Wireless Portable Internet System" filed in the Korean Intellectual Property Office on Nov. 22, 2005 and assigned Serial No. 2005-0111598, the contents of which are incorporated herein by reference.

BACKGROUND OF THE INVENTION

1. Field of the Invention

The present invention relates generally to a channel mode converting method of a wireless portable Internet system, and in particular, to a channel mode converting method for converting a diversity channel mode into a band Adaptive Modulation and Coding (Band AMC) channel mode.

2. Description of the Related Art

The wireless portable Internet is a next-generation communication system that supports mobility in local area data communication using a fixed Access Point (AP) such as a conventional wireless Local Access Network (LAN). Various standards have been provided for such a wireless portable Internet, including international standards based on the Institute of Electrical and Electronics Engineers (IEEE) 802.16d/e standard groups.

Figure 1:
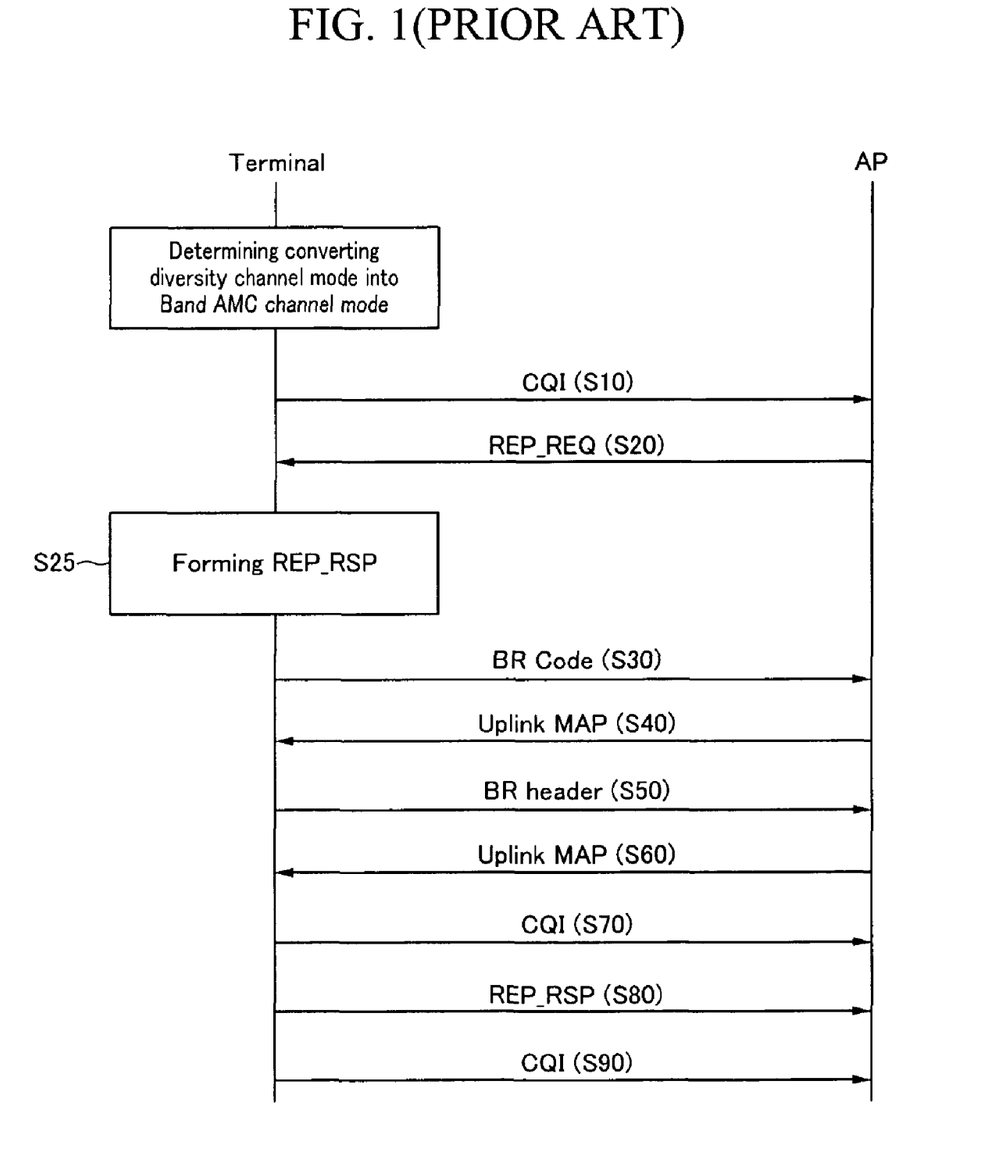
FIG. 1 is a ladder diagram illustrating converting a conventional diversity channel mode into a Band AMC channel mode and for partially changing a bandwidth of an AMC channel mode.

FIG. 1 is a ladder diagram for converting a conventional diversity channel mode into a Band AMC channel mode and for partially changing a band of an AMC channel mode.

As shown in FIG. 1, when a terminal requests to convert a channel mode and a channel state, that satisfies a conversion condition for converting a diversity channel mode into an AMC channel mode, the terminal transmits a band changing request message to the AP through a Channel Quality Indicator CHannel (CQICH) for reporting quality information of the channel to the AP in step S10. When the AP receives the band changing request message, the AP transmits a channel quality information request message (REP_REQ) to the terminal thereby satisfying the channel mode conversion conditions to request an average Carrier to Interference Noise Ratio (CINR) information of the respective bands in step S20.

The terminal forms a channel quality information response message (REP_RSP) including the CINR information of five optimum bandwidths satisfying the conversion conditions for converting the diversity channel mode into the AMC channel mode in step S25, and transmits a Bandwidth Request code (BR code) to the AP for requesting necessary resources for transmitting the REP_RSP in step S30. The AP receives the bandwidth request code, allocates an uplink resource that is capable of transmitting a resource allocation request header to the terminal in step S40, and in step S50, the terminal receives the allocated uplink resource and transmits the bandwidth information for transmitting the REP_RSP to the AP using the bandwidth request header.

In step S60, the AP allocates the requested bandwidth to the terminal using an uplink map, and in step S70 the terminal transmits the Band AMC to the CQICH through the allocated bandwidth. In addition, in step S80 the terminal transmits the REP_RSP using a frame having transmitted the Band AMC, and then, in step S90, transmits data to the AP through the AMC channel mode.

In this manner, the diversity channel is converted into the AMC channel mode, and the processes shown in FIG. 1 are repeated so as to change at least part of the five optimum bands selected while the terminal uses the AMC channel mode.

In one of a process for converting the diversity channel mode into the AMC channel mode and a process for changing a part of the bandwidths used in the AMC channel mode, it is difficult to recognize the CINR of the respective bands included in the REP_RSP as the CINR of the present band because a large delay occurs before the terminal receives the REP_REQ and transmits the REP_RSP to the AP.

Additionally, in order to correct the difference, the CINR reported to the REP_RSP using the CQICH is increased or decreased per dB. However, when the present CINR is significantly different from the REP_RSP CINR, the time delay is still generated until the difference is corrected, and accordingly, transmission errors are increased at the downlink data transmitted during the delay time.

Further, the REP_RSP is transmitted to the same frame as the CQI of the changed channel mode or is transmitted after the CQI of the changed channel mode has been transmitted. However, the CQI and the REP_RSP is respectively transmitted from a physical layer and a Media Access Control (MAC) layer through the respective resources that are independently allocated. Accordingly, it is difficult to perform transmission synchronization between the changed channel mode CQI and the REP_RSP.

SUMMARY OF THE INVENTION

The present invention has been made in an effort to provide a channel mode converting method of a wireless portable Internet system having advantages of reducing a delay time.

Additionally, the present invention has been made in an effort to provide a channel mode converting method of a wireless portable Internet system having advantages of synchronizing a point for transmitting CQI through a physical layer with a point for transmitting a message including channel quality information through MAC.

A method for converting a channel transmitting data to a terminal from a first channel mode to a second channel mode in a wireless portable Internet system according to the present invention is provided. The channel mode converting method includes receiving a channel mode conversion request message for requesting to convert the first channel to the second channel from the terminal and transmitting a second channel quality information request message to the terminal according to the channel mode conversion request message; allocating an uplink resource for responding to the second channel quality information request message when a predetermined number of frames have passed after transmitting the channel quality information request message; and converting the terminal channel from the first channel to the second channel according to a response message including the first channel quality information transmitted through the uplink resource from the terminal.

Another method for converting a first channel used when a terminal transmits/receives data to/from an access point to a second channel mode in a wireless portable Internet system according the present invention is provided. The channel mode converting method includes transmitting a channel mode conversion request message through a first channel quality indication channel to the access point; receiving an uplink map for releasing the first channel quality indication channel, a channel quality information request message for requesting a first channel quality information of a second channel, and an uplink resource for responding to the channel quality information request message allocated from the access point in response to the channel mode conversion request message; releasing the first channel quality indication channel, generating a channel quality information response message including the first channel quality information of the second channel, and transmitting the same through the uplink resource; receiving an uplink map for allocating a second quality indication channel of the second channel from the access point in response to the channel mode conversion request message; and transmitting the second channel quality information through the second channel quality indication channel, and transmitting/receiving data through the second channel.

Another method for changing a predetermined band for transmitting channel quality information among a plurality of bands forming a channel for transmitting/receiving data to/from a terminal in a wireless portable Internet system is provided. The band changing method includes receiving a predetermined band changing request message through a channel quality information indication channel from the terminal; allocating an uplink resource for responding to the message to the terminal according to the message, and transmitting an uplink map corresponding to the uplink resource to the terminal; and receiving information for the band to be changed from the terminal through the uplink resource, and changing the predetermined band according to the received information.

BRIEF DESCRIPTION OF THE DRAWINGS

The above and other objects, features and advantages of the present invention will be more apparent from the following detailed description when taken in conjunction with the accompanying drawings, in which.

DETAILED DESCRIPTION OF THE PREFERRED EMBODIMENTS

Hereinafter, a preferred embodiment of the present invention will be described in detail with reference to the accompanying drawings.

In the following description, only certain preferred embodiments of the present invention have been shown and described, simply by way of illustration. As those skilled in the art would realize, the described embodiments may be modified in various different ways, without departing from the spirit and/or scope of the present invention. In addition, the drawings and description are to be regarded as illustrative in nature and not restrictive. The same elements will be designated by the same reference numerals although they are shown in different drawings.

Figure 2:
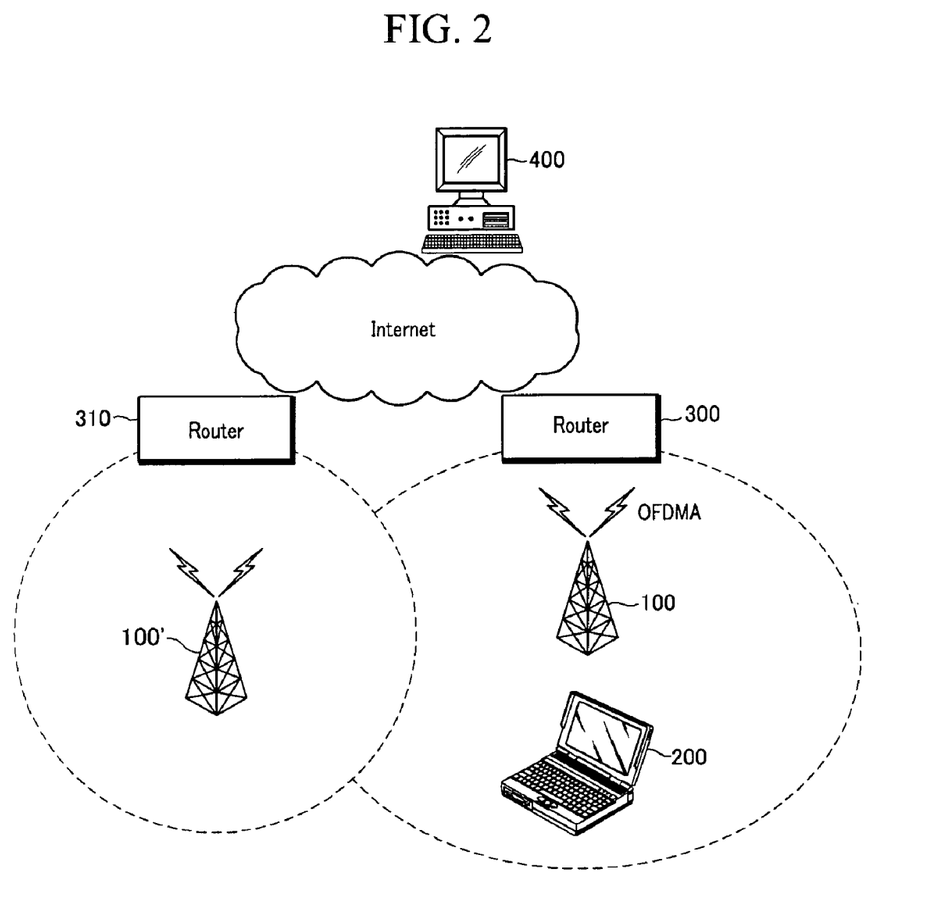
FIG. 2 is a schematic diagram illustrating a portable Internet system according to an embodiment of the present invention.

FIG. 2 is a schematic diagram illustrating a portable Internet system according to an embodiment of the present invention. Basically, the portable Internet system includes APs 100 and 100', a mobile terminal 200 for performing wireless communication with the APs 100 and 100', routers 300 and 310 that access the APs 100 and 100' through a gateway, and an Internet network. In the embodiment of the present invention, for convenience of description, the mobile terminal is referred to as a terminal.

As shown in FIG. 2, in a portable Internet system, a seamless data communication service is provided by supporting mobility whether the terminal 200 moves from a cell covered by one AP 100 to another cell covered by another AP 100', handover of the user terminal 200 is supported by such a mobile communication service, and a dynamic IP address allocation or the like is performed according to the mobility of the terminal 200.

The APs 100 and 100' can communicate with the wireless portable Internet terminal 200 by using an Orthogonal Frequency Division MultipleAccess (OFDMA) scheme. However, it is obvious that other schemes may be used. The OFDMA scheme is given as a multiplexing method that combines a frequency division method using sub-carriers of a plurality of orthogonal frequencies as a plurality of sub-channels with a time division method. The OFDMA scheme is robust against multi-path fading and has a high data rate.

The IEEE 802.16e standard employs an Adaptive Modulation and Coding (AMC) scheme that adaptively selects modulation and coding upon a request/accept between the subscriber station 200 and a base station 100 or 100'.

Figure 3:
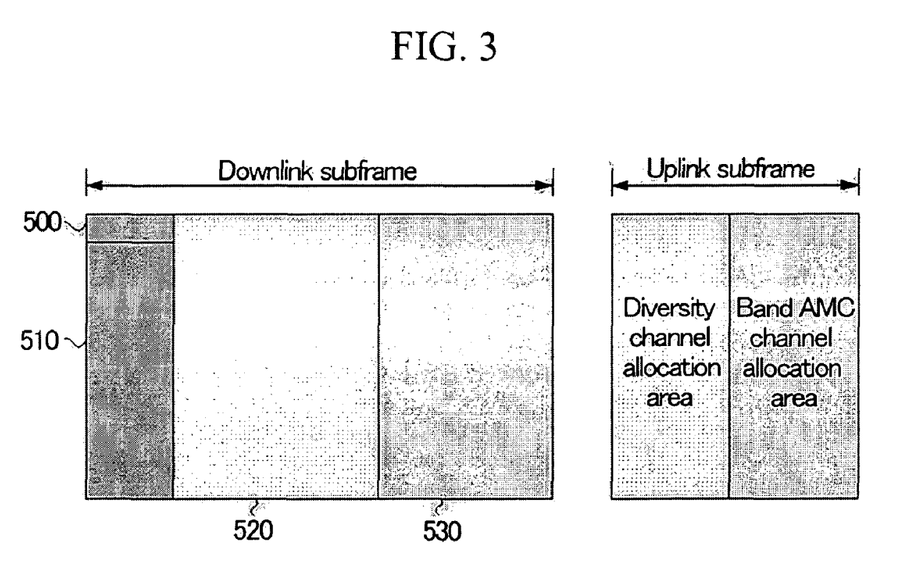
FIG. 3 is a diagram of a frame of a portable Internet system according to an embodiment of the present invention.

FIG. 3 is a diagram illustrating a frame of a portable Internet system according to an embodiment of the present invention. As shown in FIG. 3, a frame of a wireless portable Internet system includes down/up-link subframes.

The downlink subframe is divided into a Frame Control Header (FCH) 500, a DL_MAP (DownLink MAP), a UL_MAP (PpLink MAP) 510, a diversity channel allocation area 520, and a Bandwidth AMC channel allocation area 530.

The FCH 500 is formed with two sub-channels and transmits basic information for sub-channel, ranging, and modulation method or the like. The diversity channel allocation area 520 is for supporting the mobile terminal 200, and the Band AMC channel allocation area 530 is for supporting the terminal with a stable or fixed channel environment. The uplink sub-frame is divided into a diversity channel allocation area and a Band AMC channel allocation area.

Figure 4:
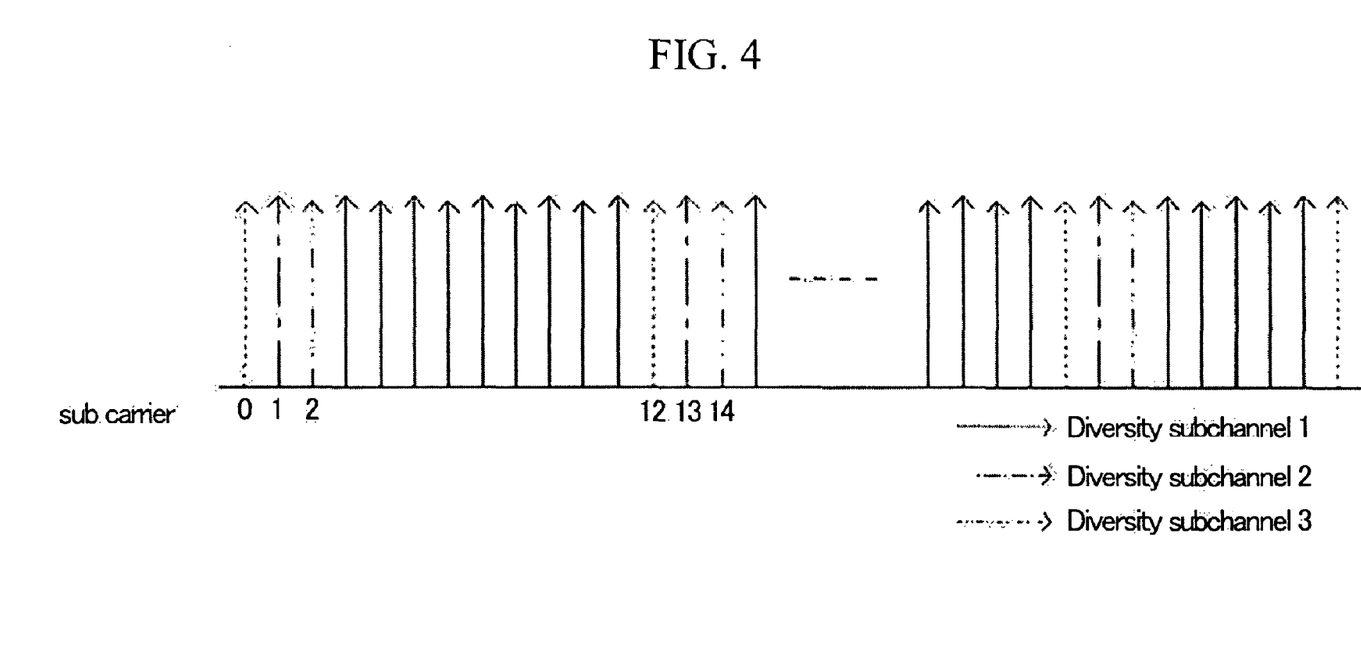
FIG. 4 is a diagram illustrating a diversity channel of a portable Internet system according to an embodiment of the present invention.

In such a wireless portable Internet system, the diversity sub-channel is formed with a set of dispersed carriers as shown in FIG. 4. FIG. 4 is a diagram of a diversity channel of a portable Internet system according to an embodiment of the present invention.

As shown in FIG. 4, the dispersed carriers are formed with 48 data carriers and 6 pilot carriers. The terminal 200 accesses the initial AP 100 using the diversity sub-channel, receives the allocated CQICH that is capable of reporting Channel Quality Information (CQI) to the AP 100, and transmits a CINR of all diversity sub-channels using the CQICH to the AP100. The AP100 determines a modulation mode and coding rate for data transmission based on the CQI information and allocates resources for transmitting/receiving data.

Figure 5:
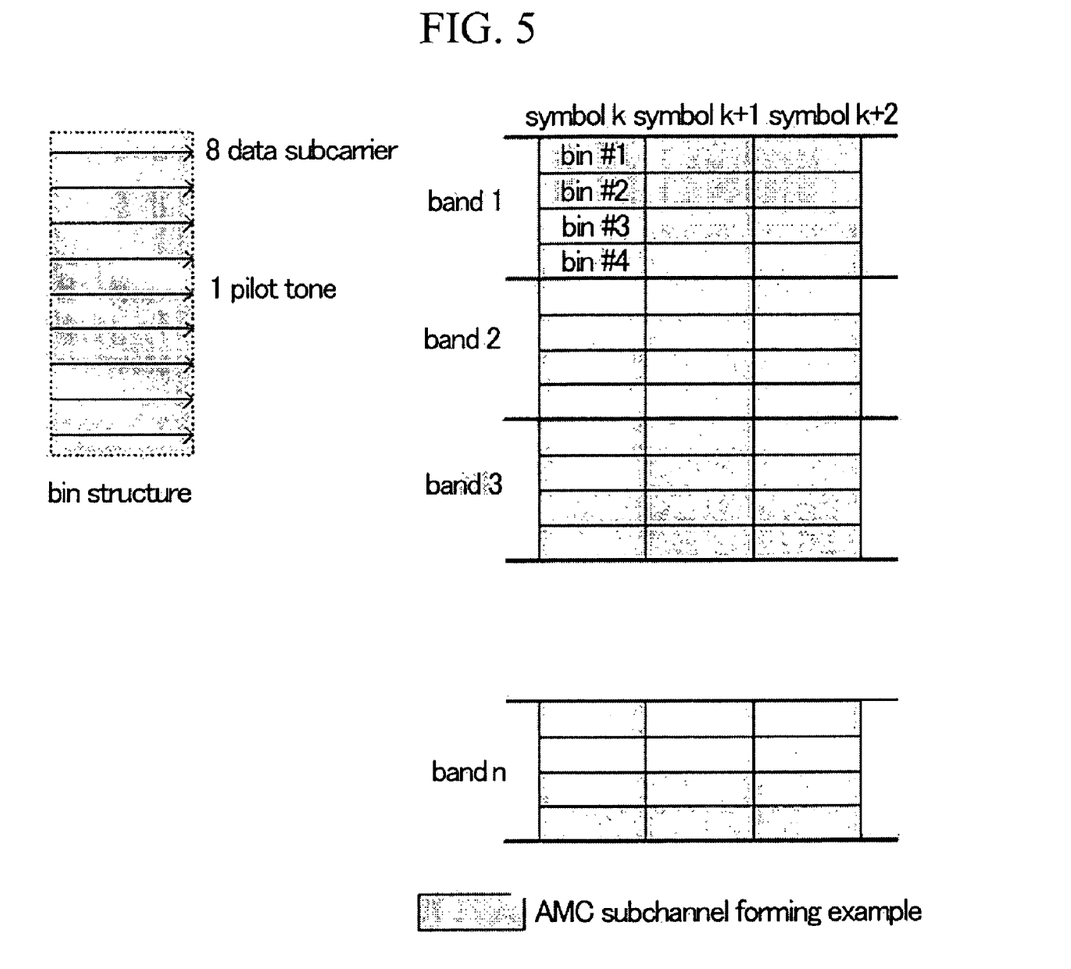
FIG. 5 is a diagram illustrating a Band and AMC subchannel of a portable Internet system according to an embodiment of the present invention.

The Band AMC sub-channel area for supporting a terminal with a stable and fixed channel environment forms a sub-channel using a carrier, as is described with reference to FIG. 5. FIG. 5 is a diagram illustrating a Band and AMC sub-channel of a portable Internet system according to an embodiment of the present invention. As shown in FIG. 5, there are eight adjacent data carriers and one pilot carrier form one bin. Further, one band is formed by grouping four adjacent bins, and the AMC sub-channel is formed with six bins accumulated in the one band.

The terminal 200 selects five optimum bands so as to convert the diversity channel mode into the AMC channel mode, and reports CINRs for the respective bands to the AP 100. In addition, the terminal calculates a difference between the reported CINRs and the present CINRs for the respective bands and transmits CQI information for increasing or decreasing the difference per dB to the AP 100.

In the wireless portable Internet system, the terminal 200 broadcasts necessary information (e.g., Band AMC entry average CINR, Band AMC entry allocation threshold) for converting the diversity channel mode into the AMC channel mode through Up-link Channel Descriptions (UCD) to all the terminals. The terminal 200 using the diversity channel performs a process for converting the diversity channel mode into the AMC channel mode when there are at least five bands ensuring that all carriers CINR are greater than a reference value (Band AMC entry average CINR) and the respective band CINR is below the maximum standard deviation (Band AMC allocation threshold) during a given period.

Figure 6:
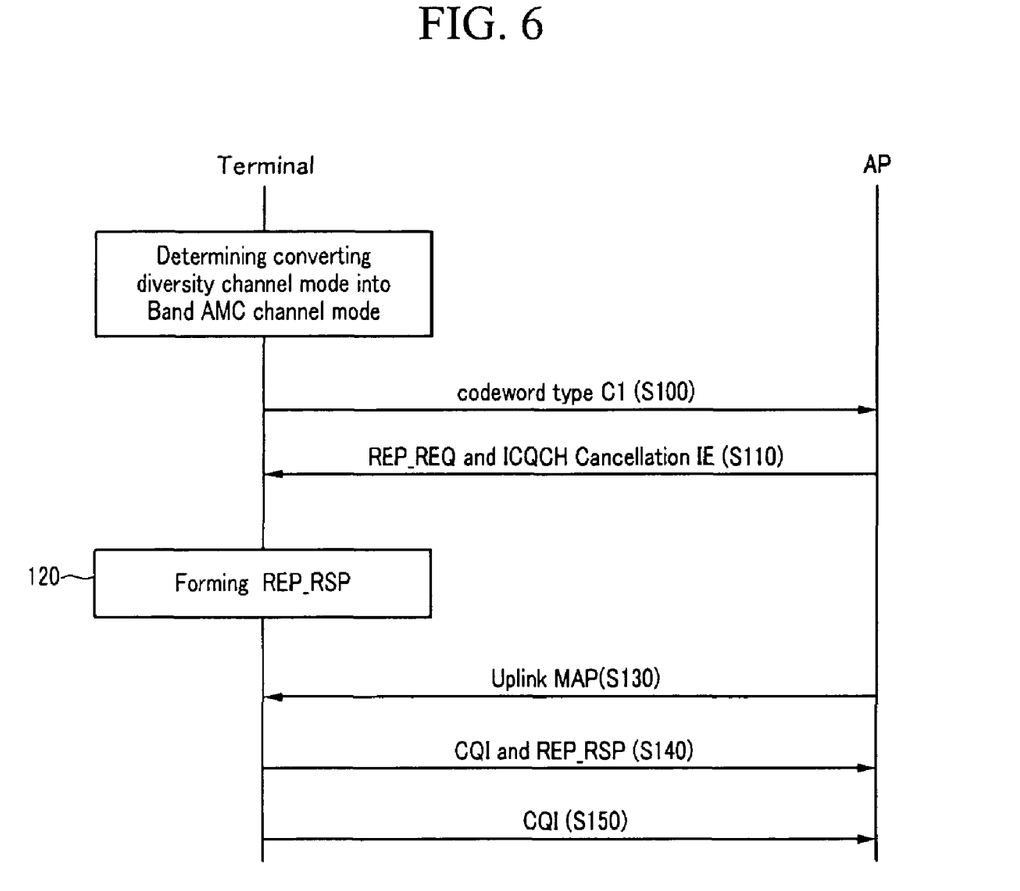
FIG. 6 is a ladder diagram illustrating converting a diversity channel mode into a Band AMC channel mode according to an embodiment of the present invention.

FIG. 6 is a ladder diagram illustrating converting a diversity channel mode into a Band AMC channel mode according to an embodiment of the present invention.

Presently, the terminal 200 can satisfy conversion conditions for converting a diversity channel mode into a BandAMC channel mode described in FIG. 5 in which there are at least five bandwidths ensuring that all carriers CINR are greater than a reference value and the respective bandCINR is below the maximum standard deviation during a given period. The terminal 200 satisfying the conditions transmits a channel mode conversion request message, that is, a codeword type C1 (0b11101) to the AP 100 through the CQICH for reporting the CQI to the AP 100 in step S100.

The codeword type C1 is used to request conversion of a normal sub-channel into the BandAMC sub-channel or changing the band of the Band AMC sub-channel. In the embodiment of the present invention, the codeword type C1 is used to request conversion of a diversity channel mode into an AMC channel mode at the AP 100. In addition, the codeword type C1 is involved in the uplink resource allocation request for transmitting the REP_RSP (channel quality information response message).

The CQICH is capable of transmitting an appointed length of bits. Generally, the CQICH is a channel that is capable of transmitting one of a 5 bits and 6-bit length. In the embodiment of the present invention, the CQICH transmits a 5 bit length. When 5 bit length information is transmitted, the terminal 200 having a diversity channel mode measures an average CINR of all channels and then expresses the same as a 5 bit value and transmits the 5 bit value to the base station through the CQICH. When the entire CINR is given as 10 dB, 01010 is expressed and transmitted.

In step S110, the AP 100 receives the codeword type C1 through the CQICH and transmits the REP_REQ to the terminal 200. Simultaneously, UpLink MAP (UL-MAP) is transmitted while including CQICH de-allocation Information Element (IE; parameters used for a message in 3GPP) so as to release the CQICH allocated to the present terminal 100 in step S110.

By transmitting the UL-MAP including the CQICH de-allocation IE, the terminal 200 easily synchronizes a time for converting the diversity channel CQI transmission into the AMC channel CQI transmission at the physical layer with a time for transmitting REP_RSP at the MAC. When the terminal 200 receives the UL-MAP including the REP_REQ and the CQICH de-allocation IE, the terminal 200 forms a REP_RSP including information for five bands selected for transmitting the same to the AP 100 in step S120.

Conventionally, the BR codes are competitively transmitted so as to transmit the REP_RSP and the BR header is used to request a bandwidth. However, the bandwidths are differently allocated to the BR headers according to the recourse state of the AP 100, and an unspecified time is required in order for the terminal to receive the allocated bandwidth so as to transmit the REP_RSP bandwidth. Accordingly, it is difficult to synchronize the REP_RSP transmission because the terminal 200 transmits a periodically allocated codeword type C2 and then the AP 100 allocates a base station.

However, according to the embodiment of the present invention, CQI de-allocation/allocation and bandwidth allocation for the REP_RSP is sequentially controlled at the AP 100. Thus, the terminal easily synchronizes a transmission order because CQI de-allocation, codeword type C2 transmission, and REP_RSP transmission according to new CQI allocation are performed appropriately for the allocation order.

In step S130, the AP 100 transmits the UL-MAP including the REP_REQ and CQICH de-allocation IE to the terminal 200 and after a predetermined frame, and transmits the UL-MAP CQICH allocation IE for allocating the uplink resource and new CQICH so as to transmit the REP_RSP in step S130. The resource frame that is allocated so as to transmit the REP_RSP now has the same frame number as that indicating a CQI transmission start at the CQICH allocation IE.

In addition, the predetermined frame implies a value that is greater than the time in which the terminal 200 determines the forming of the REP_RSP. For example, at an n-th frame, when the AP 100 transmits the REP_REQ to the terminal 200, and performs a resource allocation so as to transmit a (n+1)-th REP_RSP, a time delay of 1 or 2 frame terminal 200 is required if the terminal forms no REP_RSP. The predetermined frame now indicates the sum of one frame for forming the REP_RSP and the delay time of 1 to 2 frames.

The terminal 200 forms the REP_RSP including the CINRs of the selected five bands in response to the REP_REQ. In addition, the CQICH is released according to the CQICH de-allocation IE instructions and the CQI transmission is interrupted. The terminal 200 then transmits the REP_RSP using the allocated resource through the UL-MAP, and transmits the codeword type C2 (0b1111110) CQI for the Bandwidth AMC CQI transmission start through the CQICH allocated by the AP 100 in step S140. After the codeword type C2 CQI is transmitted, the terminal 200 transmits the CQI including information for commanding to increase or decrease the respective band CINR by 1 dB.

When the terminal 200 is operated in the Band AMC channel mode, the terminal selects five optimum bands from among a plurality of bands and reports the respective selected bandCINR to the AP 100 using the REP_RSP. In addition, the respective CQI bits correspond to the one band, that is, five bits respectively correspond to the five bands. The respective bits indicate that the CINR transmitted to the REP_RSP is increased or decreased. At this time, 0 indicates the decreasing of unit dB, and 1 indicates the increasing of unit dB.

For example, when the first band CINR of REP_RSP is given as 3 dB corresponding to a first bit among the CQI 5 bits, the AP 100 performs a downlink scheduling as "3 dB+unit dB" when the first bit of the CQI is given as 1, and performs a scheduling as "(3 dB+unit dB)–unit dB" when the next received first bit is given as 0.

When the codeword type C2 CQI is transmitted and the AP 100 receives the REP_RSP and the codeword type C2 CQI, the AP 100 transmits/receives data to/from the terminal 200 using the BandAMC sub-channel in step S150. As such, the AP 100 receiving the codeword type C1 transmits the REP_REQ to the terminal 200 and then allocates the uplink resource for transmitting the REP_RSP so that the terminal 200 may perform no resource request process for transmitting the REP_RSP, and accordingly the REP_RSP transmission delay may be reduced. In addition, the AP 100 commands the REP_REQ transmission and the de-allocation of the CQI channel allocated to the terminal 200, and after the predetermined frame delay, allocates the REP_RSP resource and the new CQI channel. Accordingly, the REP_RSP transmission can be synchronized with the codeword type C2 transmission.

A method for changing the existing part band to a new band at the terminal operating in the Band AMS mode in the present wireless portable Internet system is performed using the same processes as the method for converting the diversity channel mode into the AMC channel mode. Thus, the method for changing the existing part band to a new band has a problem, which is provided in the description of FIG. 4. According to the embodiment of the present invention, a new band changing process divided into two ways according to the downlink traffic 2 has been provided.

Figure 7:
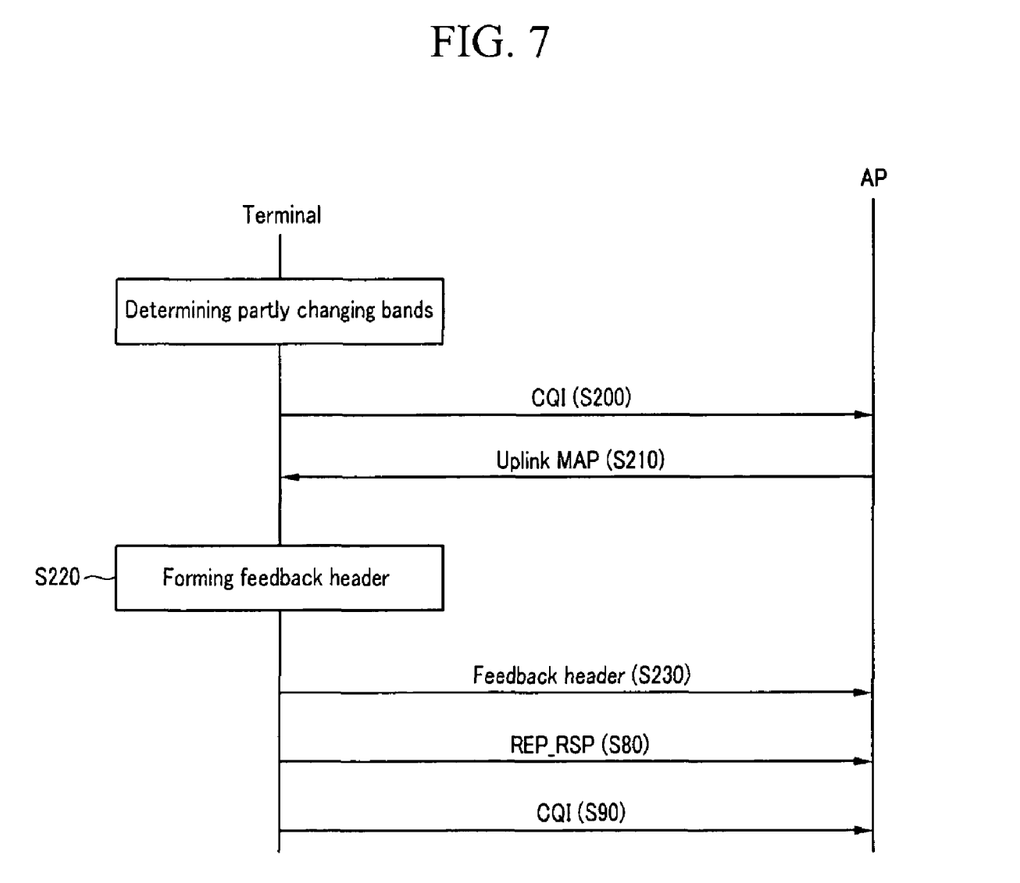
FIG. 7 is a ladder diagram illustrating changing partial bands of a Band AMC mode in the case of there being no traffic according to an embodiment of the present invention.

FIG. 7 is a flowchart for changing partial bands of a Band AMC mode in the case of there being no traffic according to an embodiment of the present invention.

As shown in FIG. 7, a codeword type C4 is newly defined so as to express a band changing request, and is involved in requesting a band change at the Band AMC sub-channel mode. When the terminal 200 changes a part of the operating band to new bands, the terminal transmits the codeword type C4 to the AP 100 through the CQICH in step S200.

When the AP 100 receives the codeword type C4 including the band changing request message, the AP 100 transmits a feedback polling IE to the UL-MAP such that it transmits the changed band information to the terminal 200 in step S210. In the wireless portable Internet standard, the UL-MAP feedback polling IE is for allocating the uplink resource to the terminal 200 such that the terminal transmits the feedback header.

The terminal 200 forms the feedback header including the band changing information using the resource allocated to the UL-MAP feedback polling IE in step S220 and transmits the same to the AP 100 in step S230. In addition, the terminal 200 transmits the codeword type C2 to the CQICH in step S240 and informs that the next transmitted CQI indicates the CINR increasing or decreasing of the five bands applying the new band. The terminal 200 then transmits data to the AP100 through the band AMC mode in step S250.

The Band AMC changing process when there is no traffic as described above is even applied to the part band changing process.

Figure 8:
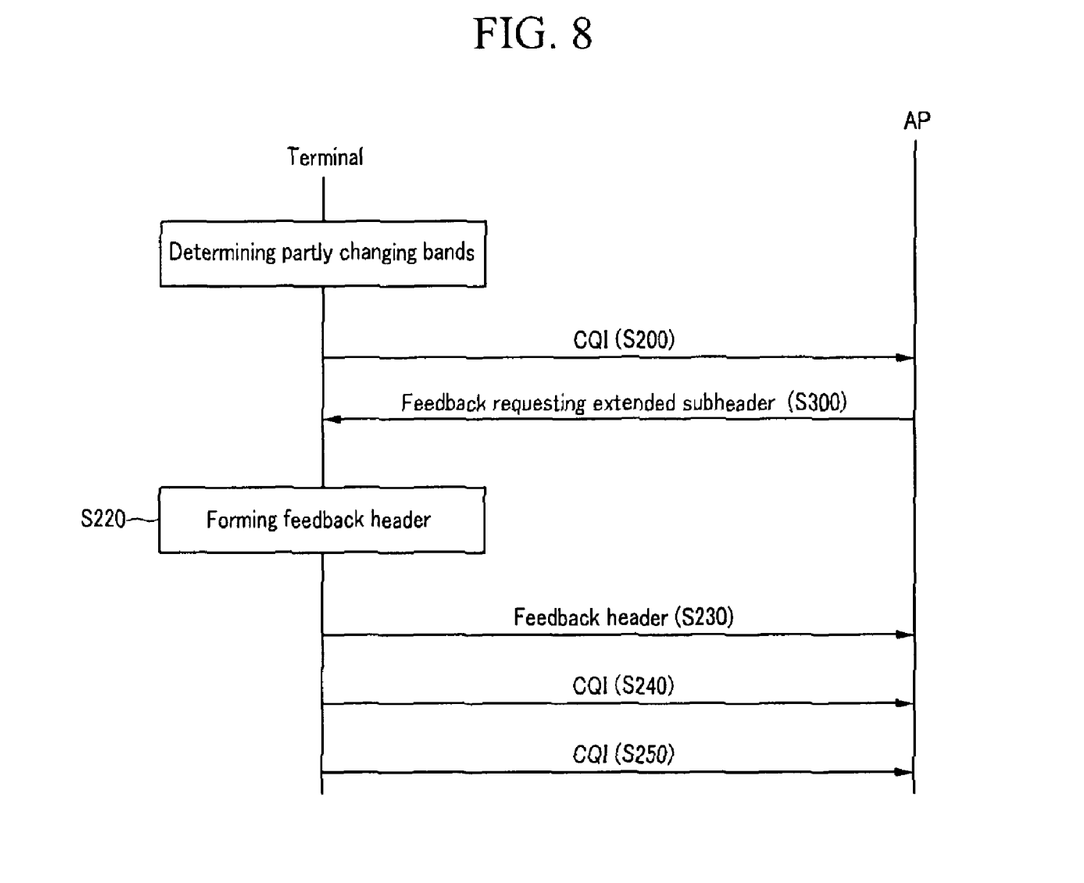
FIG. 8 is a ladder diagram illustrating changing partial bands of a Band AMC mode in the case of there being traffic according to an embodiment of the present invention.

FIG. 8 is a flowchart for changing partial bands of a Band AMC mode in the case of there being traffic according to an embodiment of the present invention.

As show in FIG. 8, the codeword type C4 is newly defined so as to express a band changing request, and the terminal transmits the codeword type C4 to the AP 100 through the CQICH when the terminal 200 wants to change a part of the operating bands to new bands in the same manner as in FIG. 7 in step S200. The AP receiving the codeword type C4 transmits a feedback request extended subheader included in the downlink PDU to the terminal in step S300. In the wireless portable Internet standard, the feedback request extended subheader is for allocating the uplink resource such that the terminal 200 transmits the feedback header.

The terminal 200 forms the feedback header including the band changing information using the uplink resource allocated to the feedback request extended header, the feedback header including the band changing information in step S220, and transmits the same to the AP 100 in step S230. In addition, the terminal 200 transmits the codeword type C2 to the CQICH in step S240 and informs that the next transmitted CQI indicates the CINR increasing or decreasing of the five bands applying the new band. The terminal 200 then transmits data to the AP100 through the Band AMC mode in step S250.

When the uplink resource for transmitting the feedback header is allocated to the feedback polling IE of the UL-MAP, more resources are consumed since the size of the UL-MAP is increased and the QPSK 1/12 of the UL-MAP is transmitted. However, the uplink resource for transmitting the feedback header is configured by adding the feedback request extended subheader to the downlink traffic PDU through the Band AMC changing process when there is traffic as described above so that the size of the UL-MAP is reduced.

The present invention covers a program for realizing the processes according to the present invention or a recording medium storing the same.

In addition, a time point for changing the diversity channel CQI transmission to the AMC channel CQI transmission at the physical layer can be easily synchronized for transmitting the REP_RSP at the MAC. The band changing process can also be simply and efficiently performed.

Further, the part band changing process can be achieved through only the entire band changing process, and the size of the UL-MAP can be reduced by adding the feedback request extended subheader.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For example, the radio resource for transmitting the channel quality information is previously allocated without additional processes when changing the diversity channel mode into the AMC channel mode in the wireless portable Internet system. Thus, the delay time for changing the diversity channel mode into the AMC channel mode can be reduced.

What is claimed is:

1. A method for converting a channel mode from a first channel mode to a second channel mode in a wireless portable Internet system, the channel mode converting method comprising:
(a) receiving from a terminal a channel mode conversion request message for requesting conversion from a first channel to a second channel, and transmitting a second channel quality information request message to the terminal according to the channel mode conversion request message;
(b) allocating an uplink resource for responding to the second channel quality information request message to the terminal when a predetermined number of frames have passed after transmitting the second channel quality information request message; and (c) converting the terminal channel from the first channel to the second channel according to a response message including first channel quality information transmitted through the uplink resource, wherein in (a), the channel mode conversion request message is transmitted from the terminal when a number of bands satisfying that an entire Carrier to Interference Noise Ratio (CINR) of the second channel is greater than a reference value, and an average CINR value measured during a predetermined time is below a maximum standard deviation and is greater than a predetermined number.

2. The channel mode converting method of claim 1, wherein in step (a), a first UpLink MAP (UL-MAP) for deallocating a first channel quality information channel allocated to the terminal is transmitted to the terminal, and in step (b), a second UL-MAP for allocating a second channel quality information channel of the second channel allocated to the terminal is transmitted to the terminal.

3. The channel mode converting method of claim 1, wherein step (c) further comprises receiving the response message including the first channel quality information transmitted from the terminal through the uplink resource;
receiving a second channel quality information transmission message from the terminal through a second channel quality information channel;
receiving the second channel quality information from the terminal; and
converting a channel for transmitting/receiving data to/from the terminal from the first channel to the second channel when receiving the response message and the second channel quality information.

4. The channel mode converting method of claim 1, wherein the first channel quality information is given as Carrier to Interference Noise Ratios (CINRs) corresponding to at least one predetermined band selected from among a plurality of bands forming the second channel, and the second channel quality information is given as a difference between presently measured CINRs and the CINRs included in the first channel quality information for the predetermined band.

5. The channel mode converting method of claim 1, wherein the predetermined number of frames is greater than a time for forming the response message for the second channel quality information request message at the terminal.

6. The channel mode converting method of claim 1, wherein the first channel is given as a diversity channel and the second channel is given as an Adaptive Modulation and Coding (AMC) channel.

7. A method for converting a first channel mode used when a terminal transmits/receives data to/from an access point to a second channel mode in a wireless portable Internet system, the channel mode converting method comprising:

(a) transmitting a channel mode conversion request message through a first channel quality indication channel to the access point;

(b) receiving a first UpLink Map (UL-MAP) for releasing the first channel quality indication channel, a channel quality information request message for requesting first channel quality information of a second channel, and an uplink resource for responding to the channel quality information request message allocated from the access point in response to the channel mode conversion request message;

(e) releasing the first channel quality indication channel, generating a channel quality information response message including the first channel quality information of the second channel, and transmitting the same through the uplink resource;

(d) receiving a second UL-MAP for allocating a second quality indication channel of the second channel from the access point in response to the channel mode conversion request message; and (e) transmitting the second channel quality information through the second channel quality indication channel, and transmitting/receiving data through the second channel, wherein in (a), the channel mode conversion request message is transmitted to the access point when a number of bands satisfying that an entire Carrier to Interference Noise Ratio (CINR) of the second channel is greater than a reference value, and an average CINR value measured during a predetermined time is below a maximum standard deviation and is greater than a predetermined number.

8. The channel mode converting method of claim 7, wherein the first channel quality information is given as CINRs corresponding to at least one predetermined band selected from among a plurality of bands forming the second channel, and the second channel quality information is given as a difference between the CINRs included in the first channel quality information and the presently measured CINRs for the predetermined band.

9. A wireless communication system comprising:
a terminal configured to transmit a channel mode conversion request message for requesting conversion from a first channel to a second channel; and
an access point configured to transmit a second channel quality information request message to the terminal according to the channel mode conversion request message received from the terminal, to allocate an uplink resource for responding to the channel quality information request message to the terminal when a predetermined number of frames have passed after transmitting the second channel quality information request message, and to convert a channel of the terminal from the first channel to the second channel according to a response message including first channel quality information, the first channel quality information being received through the uplink resource from the terminal, wherein the terminal transmits the channel mode conversion request message when a number of bands satisfying that an entire Carder to Interference Noise Ratio (CINR) of the second channel is greater than a reference value, and an average CINR value measured during a predetermined time is below a maximum standard deviation, and is greater than a predetermined number.

10. The system of claim 9, wherein the access point transmits a first UpLink MAP (UL-MAP) for deallocating a first channel quality information channel allocated to the terminal to the terminal, and transmits a second UL-MAP for allocating a second channel quality information channel allocated to the terminal to the terminal.

11. The system of claim 9, wherein the access point receives a second channel quality information transmission message from the terminal through a second channel quality information channel, receives the second channel quality information from the terminal, and converts the channel for transmitting/receiving data to/from the terminal from the first channel to the second channel when receiving the response message and the second channel quality information.

12. The system of claim 9, wherein the first channel quality information is given as CINRs corresponding to at least one predetermined band selected from among a plurality of bands forming the second channel, and the second channel quality information is given as a difference between presently measured CINRs and the CINRs included in the first channel quality information for the predetermined band.

13. The system of claim 9, wherein the predetermined number of frames is greater than a time for forming the response message for the second channel quality information request message at the terminal.

14. The system of claim 9, wherein the first channel is given as a diversity channel and the second channel is given as an AMC channel.

* * * * *